Figure 1:
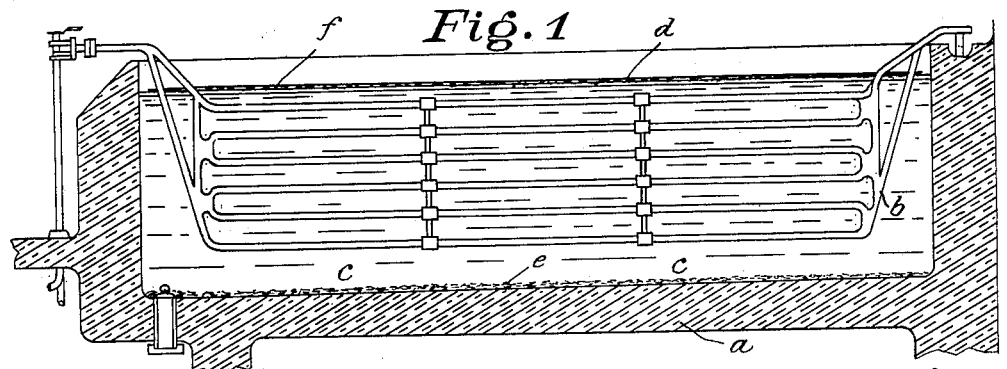

May 5, 1936.  R. SEIBEL  2,039,839
BEER CLARIFIER
Filed Aug. 31, 1933

Inventor:
Rudolf Seibel
by
Paul Freehland
Attorney

Patented May 5, 1936

2,039,839

UNITED STATES PATENT OFFICE 2,039,839

BEER CLARIFIER

Rudolf Seibel, Dusseldorf-Oberkassel, Germany

Application August 31, 1933, Serial No. 687,630
In Germany October 31, 1932

4 Claims. (Cl. 210—1)

This invention relates to a beer clarifier for clarifying beer during the main fermentation in the fermenting-vat or during the after fermentation in the store-vat.

The old methods are based on the employment of so-called clarifiers or splinters of wood, sheet-metal, or glass or clay bodies. Such clarifiers afford a relatively small clarifying surface and therefore a small clarifying effect, and their use and purification are complicated and require much time.

According to the present invention large clarifying surfaces are produced by means of foils of a metal such as aluminum, silver, nickel, as well as all other non-rusting stainless metals, and of parchment, paper, cardboard, vulcan fibre (rubber board), bakelite, cellulose, celluloid or the like. Thereby a large surface is obtained and the price of these materials is so low that they may be thrown away after using them once to save the cost of cleaning. When using, for instance, aluminum foils, the thickness of the sheets may be reduced to 0.005 mm. whereby the cost of the material is greatly reduced.

The foils may be provided with a coating, for instance, of varnish or pitch, or with a metallic deposit which does not affect the beer at all, or may even advantageously influence its taste.

Effective perforation and roughening are accomplished by making holes so deep till the metal splits, thus forming a surface like that of a grater.

Clarification is effected during the main fermentation by the foils cut into strips or ribbons which either loosely or stretched in a light frame lie or swim on the surface of the beer without obstructing either the fermentation or the development of the carbonic acid gas. The whole of the dirt separated from the wort during main fermentation adheres as a thick solid crust to the underside of the foil. This crust contains all the undesired secretions which unfavorably influence the taste and the further development of the beer during storage.

The beer will get a pure taste and will be almost ready for consumption in the fermenting-vat after the main fermentation. The yeast lying at the bottom of the fermenting-vat is quite pure and free from bitter substances. The beer pressed off from the yeast is a standard product and the yeast itself may be used without washing for the purpose of further fermentations or as an article of food.

Hitherto the secretions of the fermenting process were removed by hand with the aid of the skimming-ladle whereby loss of beer and the risk of infection are entailed and on the other hand the fermenting-dirt is not prevented from remaining in the wort and in the yeast. When the vats are of large dimensions or accessible from one side only the secretions cannot be removed by hand.

For clarifying the beer during the after fermentation in the store-vat the foils are preferably rolled up and the roll is cut open along its axis so that a number of rolled strips of foil or rings are formed.

The rolled strips are thrown singly into the store-vat. When the vat is filled all the strips of foil rise up and are distributed beneath the top of the vat. After some time the strips of foil slowly sink down according to their width and thickness and float throughout all layers of the beer; they attract the cloudy constituents of the beer, effect a higher fermentation and a reduction of the storing period of four to eight weeks and give the beer a purer and finer taste and smell and a lighter color.

Figure 2:
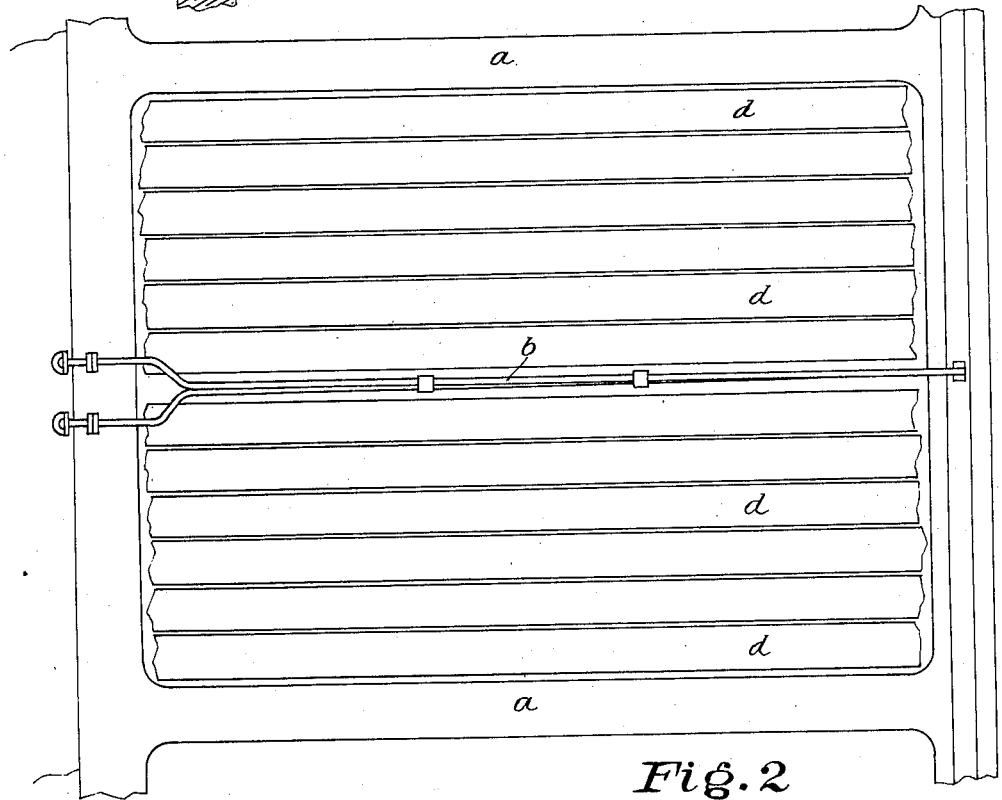
Figure 3:
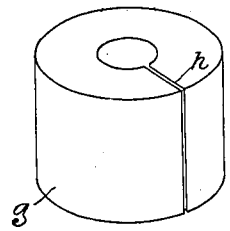

For better comprehension the invention and the means for carrying the same into practice are illustrated in the annexed drawing of which Fig. 1 is a vertical cross-sectional view of a fermenting-vat provided with clarifiers according to the present invention; Fig. 2 is a plan view of the fermenting-vat. Fig. 3 is a perspective view of a roll of foil cut into cylindric elements.

In Figs. 1 and 2 $a$ is the fermenting-vat, $b$ a cooling coil and $c$ the fermenting liquid. $d$ are the strips of foil swimming upon the surface of the liquid. The yeast $e$ settles at the bottom of the vat, whereas the dirt is precipitated as a crust $f$ beneath the foil. The foil may be between 0.005 and 0.03 mm. in thickness and in strips of the approximate width shown in Figures 2 and 3.

Fig. 3 shows a roll $g$ divided into cylindric elements by an axial cut $h$.

I claim:—

1. A clarifier for beer consisting of metal foils having a thickness of 0.005 mm. to 0.03 mm. and of sufficiently large ratio of surface to mass to float in the beer.

2. A clarifier for beer consisting of stamped metal foils having a thickness of 0.005 mm. to 0.03 mm. and of sufficiently large ratio of surface to mass to float in the beer.

3. A clarifier for beer consisting of metal foils having a thickness of 0.005 mm. to 0.03 mm. and being perforated like a grater and of sufficiently large ratio of surface to mass to float in the beer.

4. A clarifier for beer consisting of metal foils having a thickness of 0.005 mm. to 0.03 mm. and of sufficiently large ratio of surface to mass to float in the beer and being coated with an insoluble material of the class consisting of varnish and pitch inert to the beer.

RUDOLF SEIBEL.